United States Patent
Liu et al.

(10) Patent No.: US 7,088,888 B2
(45) Date of Patent: Aug. 8, 2006

(54) WAVEGUIDE-BASED BRAGG GRATINGS WITH SPECTRAL SIDELOBE SUPPRESSION AND METHOD THEREOF

(75) Inventors: Ansheng Liu, Cupertino, CA (US); Shlomo Ovadia, San Jose, CA (US); Dean A. Samara-Rubio, San Jose, CA (US); Michael T. Morse, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 10/822,302

(22) Filed: Apr. 9, 2004

(65) Prior Publication Data

US 2004/0190829 A1 Sep. 30, 2004

Related U.S. Application Data

(62) Division of application No. 10/188,016, filed on Jul. 1, 2002.

(51) Int. Cl.
*G02B 6/34* (2006.01)

(52) U.S. Cl. ........................................ 385/37; 385/129
(58) Field of Classification Search ............... 385/37
See application file for complete search history.

(56) References Cited

U.S. PATENT DOCUMENTS

| | | | |
|---|---|---|---|
| 4,518,219 A | 5/1985 | Leonberger et al. | |
| 4,725,110 A | 2/1988 | Glenn et al. | |
| 4,815,084 A | 3/1989 | Scifres et al. | |
| 4,984,894 A | 1/1991 | Kondo | |
| 5,082,342 A | 1/1992 | Wight et al. | |
| 5,159,601 A | 10/1992 | Huber | |
| 5,195,161 A * | 3/1993 | Adar et al. | 385/129 |
| 5,212,745 A | 5/1993 | Miller | |
| 5,237,576 A | 8/1993 | DiGiovanni et al. | |
| 5,247,528 A * | 9/1993 | Shinozaki et al. | 372/22 |
| 5,285,274 A | 2/1994 | Tanno et al. | |
| 5,315,437 A | 5/1994 | Alfano et al. | |
| 5,379,318 A | 1/1995 | Weber | |
| 5,418,802 A | 5/1995 | Chwalck | |
| 5,446,809 A | 8/1995 | Fritz et al. | |
| 5,448,404 A | 9/1995 | Schrenk et al. | |
| 5,467,732 A | 11/1995 | Donnelly, Jr. et al. | |
| 5,493,113 A | 2/1996 | Dunphy et al. | |

(Continued)

FOREIGN PATENT DOCUMENTS

EP     1094574 A1    4/2001

OTHER PUBLICATIONS

Erdogan, Turan, "Fiber Grating Spectra," *Journal of Lightwave Technology*, vol. 15, No. 8, pp. 1277-1294, Aug. 1997.

(Continued)

*Primary Examiner*—Joseph Williams
*Assistant Examiner*—Dalei Dong
(74) *Attorney, Agent, or Firm*—Blakely, Sokoloff, Taylor & Zafman LLP

(57) ABSTRACT

A waveguide Bragg grating (WBG) is apodized by varying the duty cycle of selected grating periods while fixing the pitch of the grating periods. In one embodiment, the WBG is implemented in a silicon substrate using polysilicon filled trenches of varying width while keeping the grating periods' pitch constant. The polysilicon trenches are formed so that if the width of one trench is increased compared to an adjacent grating period, the trench width in the other adjacent grating period (if present) is decreased.

14 Claims, 8 Drawing Sheets

U.S. PATENT DOCUMENTS

| | | | |
|---|---|---|---|
| 5,511,083 A | | 4/1996 | D'Amato et al. |
| 5,511,142 A | | 4/1996 | Horie et al. |
| RE35,516 E | | 5/1997 | Henry et al. |
| 5,627,927 A | | 5/1997 | Udd |
| 5,636,309 A | | 6/1997 | Henry et al. |
| 5,668,900 A | | 9/1997 | Little et al. |
| 5,689,358 A | | 11/1997 | Nakao et al. |
| 5,751,466 A | * | 5/1998 | Dowling et al. ............ 359/248 |
| 5,764,829 A | | 6/1998 | Judkins et al. |
| 5,781,268 A | | 7/1998 | Liu et al. |
| 5,796,902 A | * | 8/1998 | Bhat et al. .................. 385/122 |
| 5,801,378 A | * | 9/1998 | Hane et al. ............. 250/237 G |
| 5,907,427 A | * | 5/1999 | Scalora et al. .............. 359/248 |
| 5,915,051 A | | 6/1999 | Damask et al. |
| 6,011,881 A | | 1/2000 | Moslehi et al. |
| 6,014,480 A | | 1/2000 | Baney |
| 6,061,481 A | | 5/2000 | Heidrich et al. |
| 6,075,908 A | * | 6/2000 | Paniccia et al. .............. 385/14 |
| 6,141,469 A | | 10/2000 | Kashyap |
| 6,172,791 B1 | | 1/2001 | Gill et al. |
| 6,221,565 B1 | | 4/2001 | Jain et al. |
| 6,233,381 B1 | | 5/2001 | Borrelli et al. |
| 6,259,529 B1 | | 7/2001 | Sorin et al. |
| 6,266,464 B1 | | 7/2001 | Day et al. |
| 6,268,953 B1 | | 7/2001 | Maloney |
| 6,327,036 B1 | | 12/2001 | Bao et al. |
| 6,330,255 B1 | | 12/2001 | Hung |
| 6,330,383 B1 | | 12/2001 | Cai et al. |
| 6,337,737 B1 | | 1/2002 | Chang et al. |
| 6,343,167 B1 | * | 1/2002 | Scalora et al. ................ 385/37 |
| 6,363,202 B1 | | 3/2002 | Goodfellow |
| 6,373,872 B1 | | 4/2002 | Deacon |
| 6,374,013 B1 | | 4/2002 | Whiteaway et al. |
| 6,411,756 B1 | | 6/2002 | Sadot et al. |
| 6,438,277 B1 | | 8/2002 | Eggleton et al. |
| 6,459,533 B1 | * | 10/2002 | Clapp et al. ................ 359/578 |
| 6,480,513 B1 | | 11/2002 | Kapany et al. |
| 6,529,649 B1 | | 3/2003 | Soole |
| 6,538,783 B1 | | 3/2003 | Stephens |
| 6,546,160 B1 | | 4/2003 | Schunk |
| 6,600,864 B1 | | 7/2003 | Samara-Rubio et al. |
| 6,628,450 B1 | | 9/2003 | Samara-Rubio |
| 6,661,937 B1 | | 12/2003 | Sobiski et al. |
| 6,674,928 B1 | | 1/2004 | Johnson et al. |
| 6,748,138 B1 | | 6/2004 | Wang et al. |
| 6,775,427 B1 | | 8/2004 | Evans |
| 2002/0025097 A1 | | 2/2002 | Cooper et al. |
| 2002/0085810 A1 | | 7/2002 | Lee at al. |
| 2002/0113966 A1 | | 8/2002 | Shchegrov et al. |
| 2002/0197011 A1 | | 12/2002 | Liu et al. |
| 2003/0013438 A1 | | 1/2003 | Darby |
| 2003/0020865 A1 | | 1/2003 | Hoke |
| 2003/0021305 A1 | | 1/2003 | Lundqvist |
| 2003/0025976 A1 | | 2/2003 | Wipiejewski |
| 2003/0086155 A1 | | 5/2003 | Ovadia et al. |
| 2003/0086655 A1 | | 5/2003 | Deacon |
| 2003/0091086 A1 | | 5/2003 | Sahara et al. |
| 2003/0091287 A1 | | 5/2003 | Lam et al. |
| 2003/0099018 A1 | | 5/2003 | Singh et al. |
| 2004/0033020 A1 | | 2/2004 | LoCascio et al. |
| 2004/0052522 A1 | | 3/2004 | Fishteyn et al. |

OTHER PUBLICATIONS

Hill, Kenneth O. et al., "Fiber Bragg Grating Technology Fundamentals and Overview," *Journal of Lightwave Technology*, vol. 15, No. 8, pp. 1263-1276, Aug. 1997.

Studenkov, P.V. et al., "Asymmetric Twin-Waveguide 1.55-μm Wavelength Laser with a Distributed Bragg Reflector," *IEEE Photonics Technology Letters*, vol. 12, No. 5, pp. 468-470, May 2000.

Willner, A.E. et al., "Tunable Compensation of Channel Degrading Effects Using Nonlinearly Chirped Passive Fiber Bragg Gratings," *IEEE Journal of Selected Topics in Quantum Electronics*, vol. 5, No. 5, pp. 1298-1311, Sep./Oct. 1999.

Giles, C.R., "Lightwave Applications of Fiber Bragg Gratings," *Journal of Lightwave Technology*, vol. 15, No. 8, pp. 1391-1404, Aug. 1997.

Sugden, K. et al., "Fabrication and Characterization of Bandpass Filters Based on Concatenated Chirped Fiber Gratings," *Journal of Lightwave Technology*, vol. 15, No. 8, pp. 1424-1432, Aug. 1997.

Wiesmann, D. et al., "Apodized Surface-Corrugated Gratings with Varying Duty Cycles", *IEEE Photonics Technology Letters*, vol. 12, No. 6, pp. 639-641, Jun. 2000.

Shibata, Y. et al., "Coupling Coefficient Modulation of Waveguide Grating Using Sampled Grating", *IEEE Photonics Technology Letters*, vol. 6, No. 10, pp. 1222-1224, Oct. 1994.

"Encyclopedia.com-Results for laser," *The Columbia Electronic Encyclopedia, Sixth Edition*. Retrieved Aug. 15, 2001 from http://www.encyclopedia.com/articles/07237.html.

"Encyclopedia.com-Results for laser: Coherent Light and Its Emission in Lasers," *The Columbia Electronic Encyclopedia, Sixth Edition*. Retrieved Aug. 15, 2001 from http://www.encyclopedia.com/articles/07237CoherentLightandItsEmissioninLasers.html.

"Encyclopedia.com-Results for laser: Characteristics of Lasers," *The Columbia Electronic Encyclopedia, Sixth Edition*. Retrieved Aug. 15, 2001 from http://www.encyclopedia.com/articles/07237CharacteristicsofLasers.html.

"Encyclopedia.com-Results for laser: Applications of Lasers," *The Columbia Electronic Encyclopedia, Sixth Edition*. Retrieved Aug. 15, 2001 from http://www.encyclopedia.com/articles/07237ApplicationsofLasers.html.

"Laser," Microsoft® Encarta® Online Encyclopedia 2001. Retrieved Aug. 15, 2001 from http://encarta.msn.com/find/Concise.asp?z=1&pg=2&ti=761578658.

Weschler, Mattew, "How Lasers Work," *Howstuffworks*. Retrieved Aug. 15, 2001 from http://www.howstuffworks.com/laser.htm.

Weschler, Mattew, "How Lasers Work: The Basics of an Atom," *Howstuffworks*. Retrieved Aug. 15, 2001 from http://www.howstuffworks.com/laser1.htm.

Weschler, Mattew, "How Lasers Work: The Laser/Atom Connection," *Howstuffworks*. Retrieved Aug. 15, 2001 from http://www.howstuffworks.com/laser2.htm.

Weschler, Mattew, "How Lasers Work: Three-Level Laser," *Howstuffworks*. Retrieved Aug. 15, 2001 from http://www.howstuffworks.com/laser3.htm.

Weschler, Mattew, "How Lasers Work: Types of Lasers," *Howstuffworks*. Retrieved Aug. 15, 2001 from http://www.howstuffworks.com/laser4.htm.

Weschler, Mattew, "How Lasers Work: Laser Classifications," *Howstuffworks*. Retrieved Aug. 15, 2001 from http://www.howstuffworks.com/laser5.htm.

Weschler, Mattew, "How Lasers Work: Links," *Howstuffworks*. Retrieved Aug. 15, 2001 from http://www.howstuffworks.com/laser6.htm.

Maluf, Nadim, "Lasers: A Tutorial," New Focus® , Opticon 2001, San Jose, CA, pp. 1-48.

Bilodeau, F. et al., "High-Return-Loss Narrowband All-Fiber Bandpass Bragg Transmission Filter", IEEE Photonic Technology Letters, vol. 6, No. 1, Jan. 1994, pp. 80-82.

* cited by examiner

WAVEGUIDE-BASED BRAGG GRATINGS WITH SPECTRAL SIDELOBE SUPPRESSION AND METHOD THEREOF

CROSS REFERENCE TO RELATED APPLICATIONS

The present application is a Divisional Application of co-pending U.S. patent application Ser. No. 10/188,016 filed on Jul. 1, 2002. The present application is related to U.S. patent application Ser. No. 09/881,218 filed Jun. 13, 2001.

FIELD OF THE INVENTION

Embodiments of invention relate generally to optical devices and, more specifically but not exclusively relate to Bragg grating optical devices.

BACKGROUND INFORMATION

Transmission bandwidth demands in telecommunication networks (e.g., the Internet) appear to be ever increasing and solutions are being sought to support this bandwidth demand. One solution to problem is to use optical networks, where wavelength-division-multiplexing (WDM) technology is used to support the ever-growing demand for higher data rates. Commonly used optical components include Bragg gratings.

Bragg gratings can be implemented in optical fibers (i.e., also known as fiber Bragg gratings or FBGs) or in integrated circuits (i.e., also known as waveguide Bragg gratings or WBGs). WBGs are considered to be one of the key components for future WDM systems and networks.

WBGs are typically realized as surface corrugated grating structures. Typical surface corrugated WBGs have relatively large spectral sidelobes. Conventional solutions to reduce spectral sidelobes in surface corrugated WBGs include using e-beam lithography to form cascaded uniform gratings, each uniform grating having a different fixed duty-cycle. However, e-beam lithography is relatively costly and complex.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Embodiments of the present invention are directed to apparatus and systems (and methods thereof) having a grating structure that includes a substrate and several regions formed in the substrate. The regions are formed so as to have refractive indices that are different from that of the substrate. In one embodiment, the grating structure is formed of multiple concatenated grating sections, each with a different grating pitch. Each grating section has grating periods with substantially constant pitch, with each grating period including one of the regions. The width of the regions varies among the grating periods, thereby varying the duty cycles of the grating periods. The duty cycle variation can be used to advantageously control the apodization of each of the grating section structure. Several embodiments of the present invention are described below.

Figure 1:
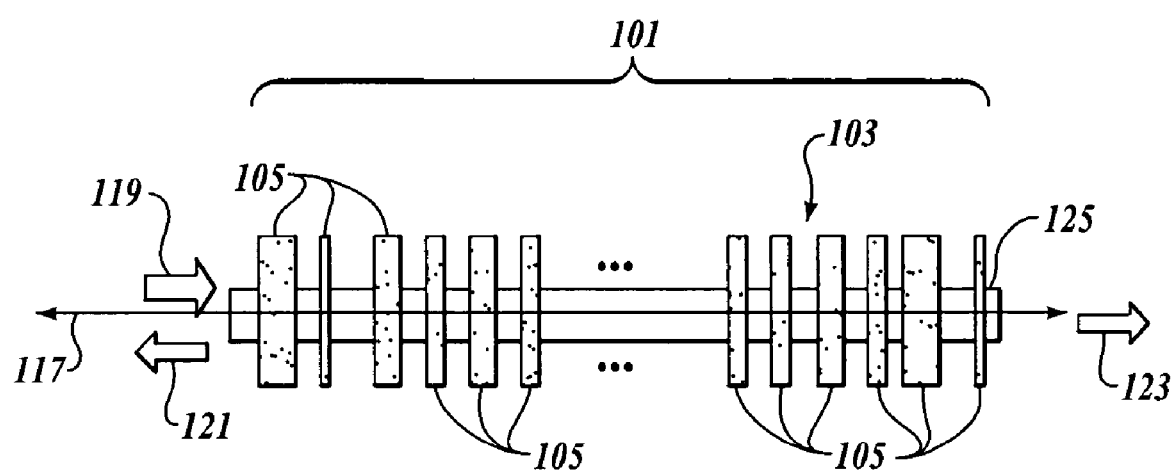
FIG. 1 is a diagram illustrating a waveguide Bragg grating (WBG), according to one embodiment of the present invention.

FIG. 1 illustrates a waveguide Bragg grating (WBG), according to one embodiment of the present invention. In this embodiment, WBG 101 is formed in a substrate 103, with a several regions 105 formed along a waveguide 125. In some embodiments, regions 105 are filled trenches, with the fill material having a refractive index different from that of the material of substrate 103. For example, in one embodiment, substrate 103 is crystalline silicon of a silicon wafer, with regions 105 being polysilicon material. In other embodiments, different materials can be used for substrate 103 and regions 105, provided the selected materials have different refractive indices.

Waveguide 125 implements an optical path 117, represented in FIG. 1 as a double headed arrow. In this embodiment, trenches 105 are formed to be substantially perpendicular to optical path 117. The trenches are formed in substrate 103 using standard photolithographic processes and, in one embodiment, the polysilicon is formed in the trenches using a suitable deposition technique such as, for example, low pressure chemical vapor deposition (LPCVD). In addition, the structure can be formed using one mask. In contrast, the e-beam technology (described in the aforementioned apodized surface corrugated WBGs) is significantly more complex and typically requires more than one mask. In other embodiments, regions 105 may be formed by doping regions 105 to alter the regions' refractive indices.

In accordance with this embodiment of the present invention, regions 105 are formed so as to apodize WBG 101 by selectively varying the width of a region 105 within each grating period of all of the grating periods of WBG 101. In addition, the pitch of each grating period is substantially uniform (i.e., a fixed or constant pitch) across WBG 101. The rest of the grating period is formed by the intervening area of substrate 103 (i.e., the area of substrate 103 between the grating period's region 105 and the region 105 of the next grating period). The term "duty cycle" is used herein to refer to the percentage of a grating period that the width of the region 105 occupies (with the remaining percentage of the pitch corresponding to the width of the intervening area of substrate 103. Thus, in this embodiment, WBG 101 is apodized by varying the duty cycle from one grating to another while keeping the grating pitch fixed or constant. Although small variations in the grating pitch may be present in the WBG, in this embodiment the average grating pitch for should be "centered" on the desired Bragg wavelength.

In a further refinement, the regions 105 can be formed so that the region of each grating period alternates between increasing and decreasing in width from one end of the WBG to the other. For example, the widths of regions 105 in the grating periods on either side of a particular grating period (i.e., adjacent grating periods) would both be smaller (or both greater) than the duty cycle of that grating period. This alternating duty cycle arrangement can facilitate a substantially constant Bragg wavelength over all areas of the WBG. One embodiment of such an alternating arrangement is described below in conjunction with FIG. 2.

In operation, an optical beam 119 is propagated along optical path 117 through waveguide 125. The interfaces between the alternating regions 105 and substrate 103 in the optical path result in periodic or quasi-periodic perturbations in the effect refractive index along optical path 117. These perturbations cause multiple reflections of portions of optical beam 119. When the Bragg condition is satisfied, wavelength components of optical beam 119 having a Bragg wavelength will be reflected by WBG 101 (indicated by an arrow 121 in FIG. 1). Conversely, wavelength components of optical beam 119 having non-Bragg wavelengths will propagate through WBG 101 (indicated by an arrow 123 in FIG. 1).

Figure 2:
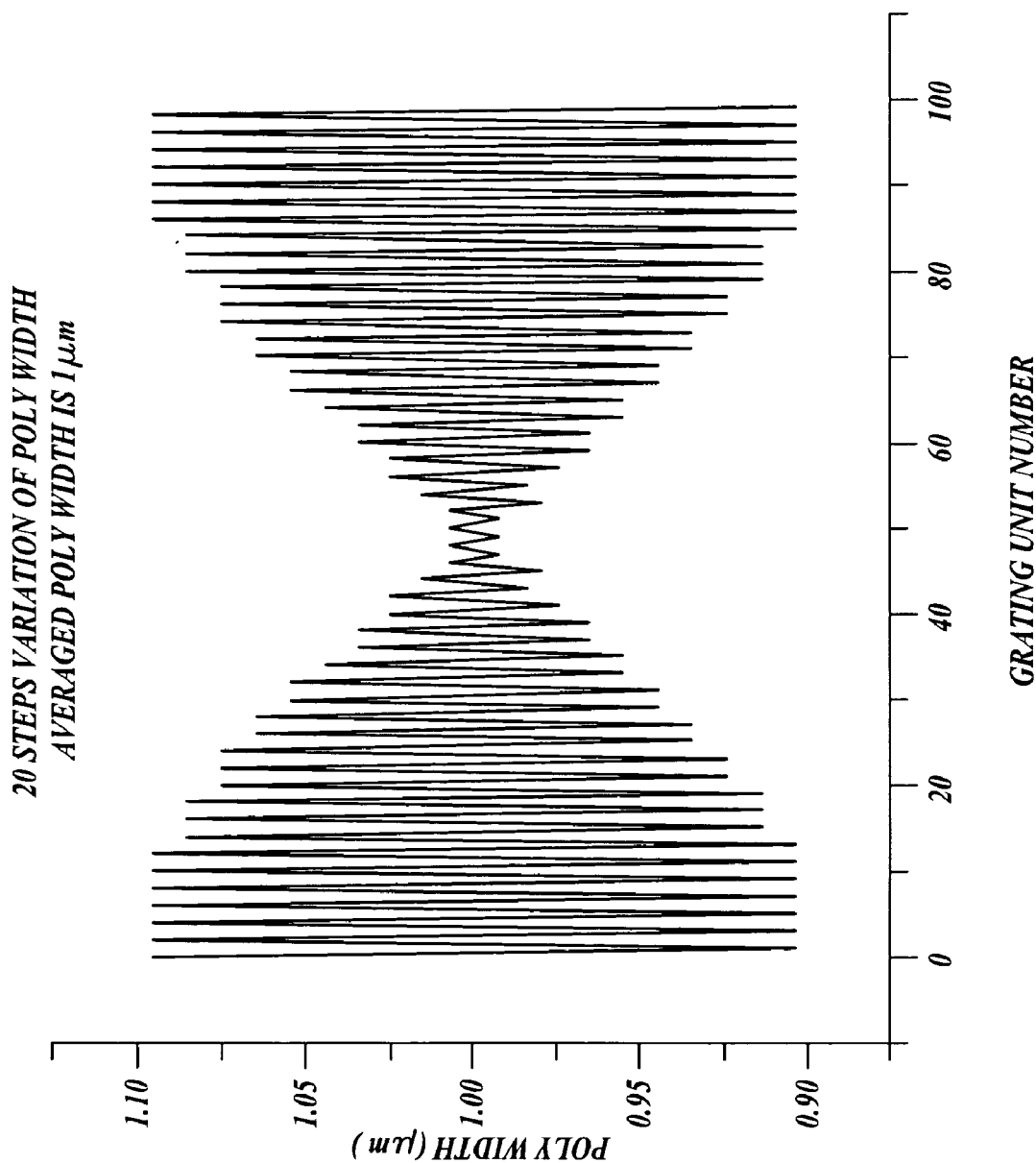
FIG. 2 is a diagram illustrating the width variation of one layer of material along a WBG, according to one embodiment of the present invention.

FIG. 2 is a diagram illustrating the width variation of regions 105 along propagation path 117 of WBG 101, according to one embodiment of the present invention. In this exemplary embodiment, WBG 101 is formed from one hundred grating periods that have one of twenty duty cycles (i.e., twenty steps). The example of FIG. 2 illustrates the width (or pitch) of regions 105 that are formed as polysilicon-filled trenches in a crystalline silicon substrate 103. Further, the grating period is about 2.0 µm in this embodiment, with the width of regions 105 having an average value of about 1 µm.

As shown in FIG. 2, at one end of WBG 101, the grating period has a polysilicon region 105 with a width of about 1.10 µm. In the next adjacent grating period, the polysilicon region 105 has a width of about 0.90 µm. In this example, a total of about fourteen grating periods have polysilicon region widths alternating between 1.10 µm and 0.90 µm. These two polysilicon widths represent two of the twenty steps. The next group of six grating periods alternate between 1.08 µm and 0.92 µm steps. Thus, the step "range" of this group of grating periods narrows from the previous group of grating periods. The next thirty grating periods have groups of alternating steps with eight narrowing step ranges (i.e., from about 1.07 µm to about 1.01 µm). The next fifty grating periods have ten groups of expanding step ranges, which are arranged in the "mirror image" of the first fifty grating periods. This configuration is designed to achieve a peak Bragg wavelength of about 1551 nanometers. In other embodiments, the WBG can be implemented with a different number of steps and with a different grating period.

Figure 3A:
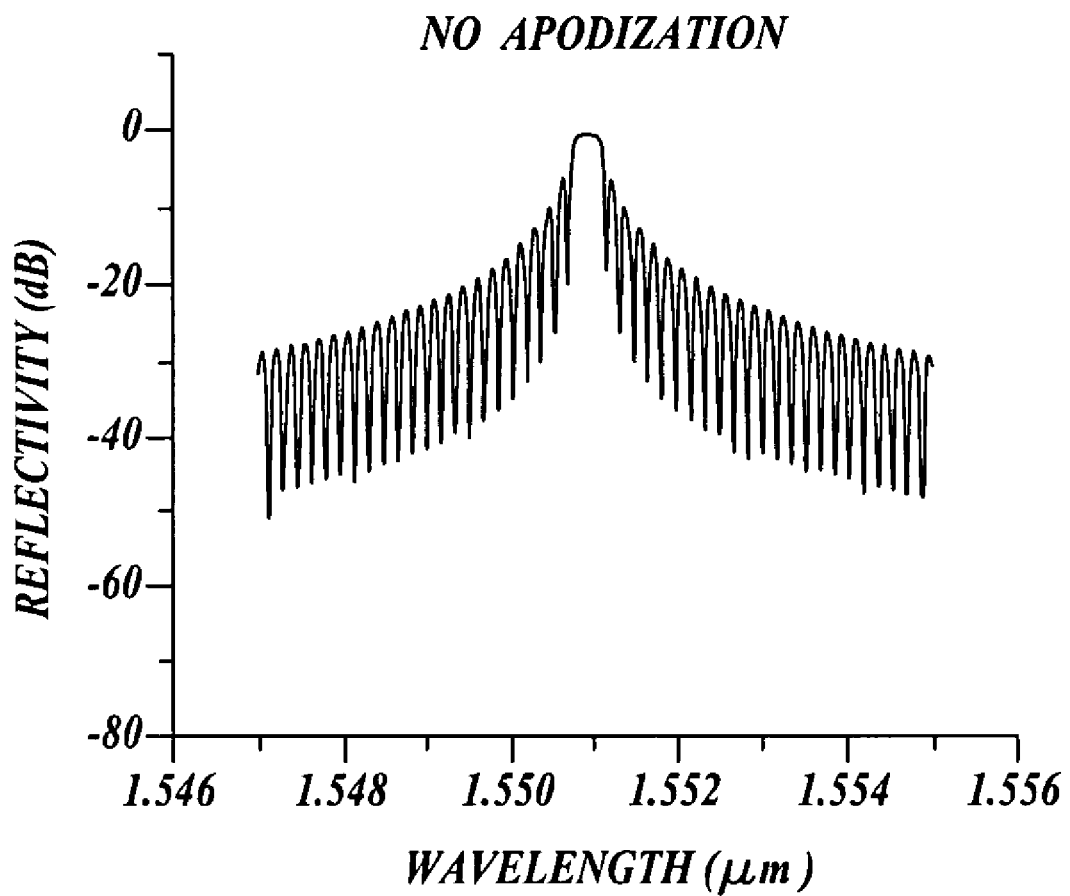
FIGS. 3A–3C are graphs respectively illustrating simulated reflection spectra of a 1000 period WBG with no apodization, twenty step apodization according to an embodiment of the present invention, and one thousand step apodization according to another embodiment of the present invention.
Figure 3B:
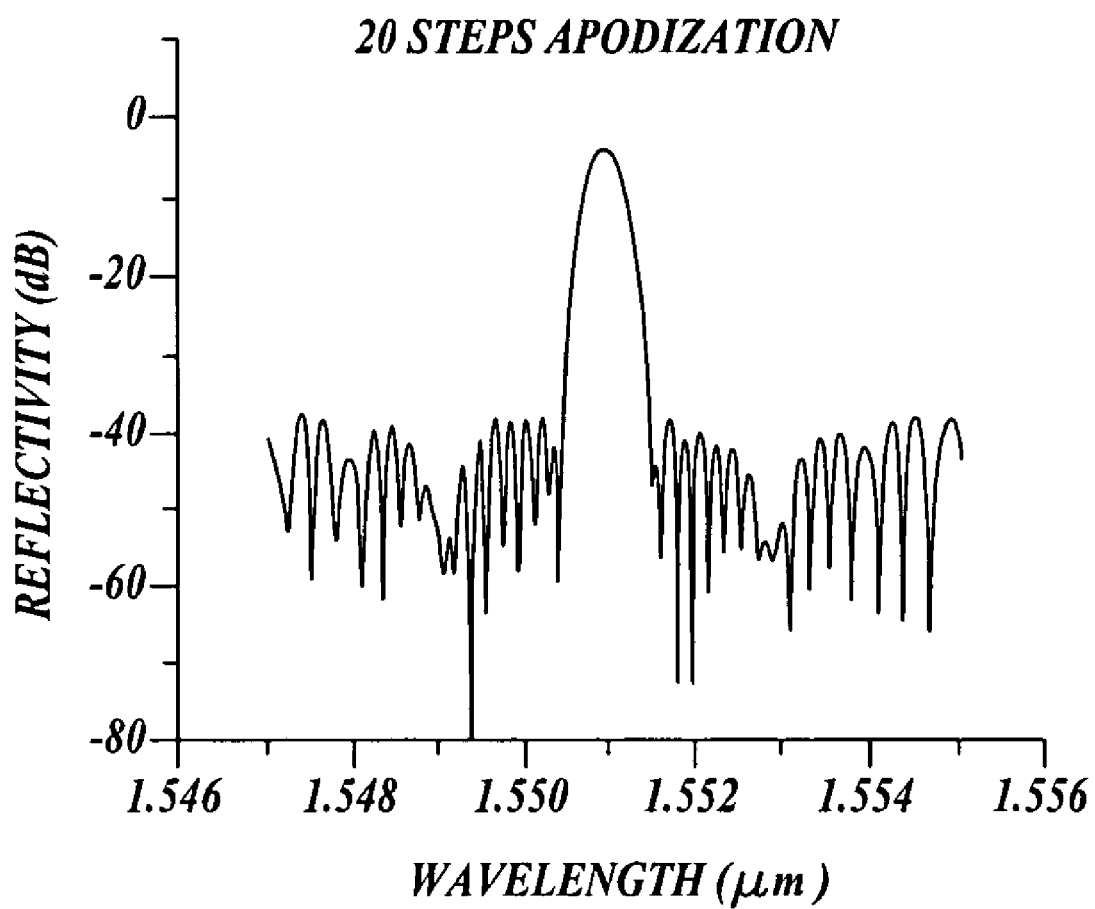
Figure 3C:
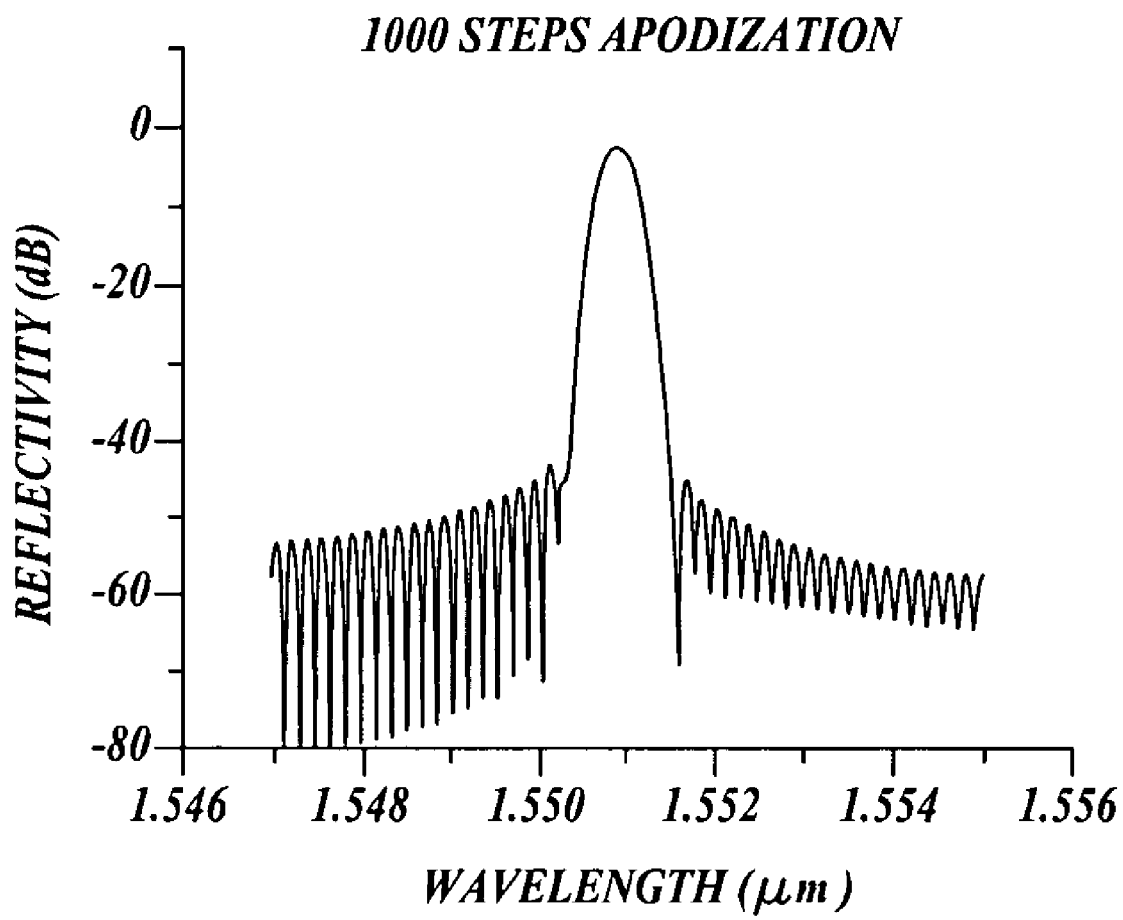

FIGS. 3A–3C are graphs respectively illustrating simulated reflection spectra (as a function of wavelength) of WBGs having no apodization, twenty step apodization as in FIG. 2, and one thousand step apodization using variable duty cycle fixed grating pitch apodization. The worst-case grating extinction ratio is defined as the reflectance ratio (in dB) of the peak Bragg wavelength to the peak of the first side-lobe. As shown in FIG. 3A (i.e., no apodization), the simulated extinction ratio is less than 15 dB. With twenty step apodization according to the embodiment of FIG. 2, the extinction ratio is about 35 dB. With one thousand step apodization, the extinction ratio improves to about 40 dB.

Figure 4:
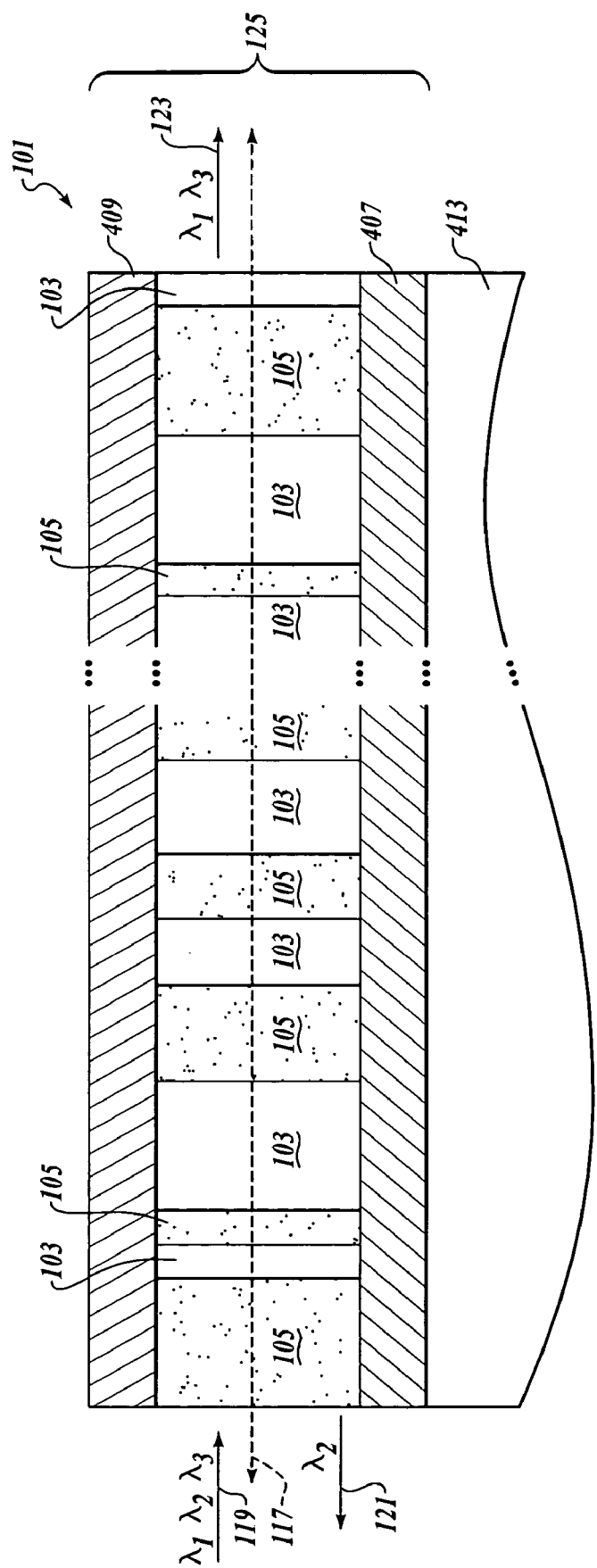
FIG. 4 is a diagram illustrating a cross-sectional view of an apodized WBG according to one embodiment of the present invention.
Figure 5:
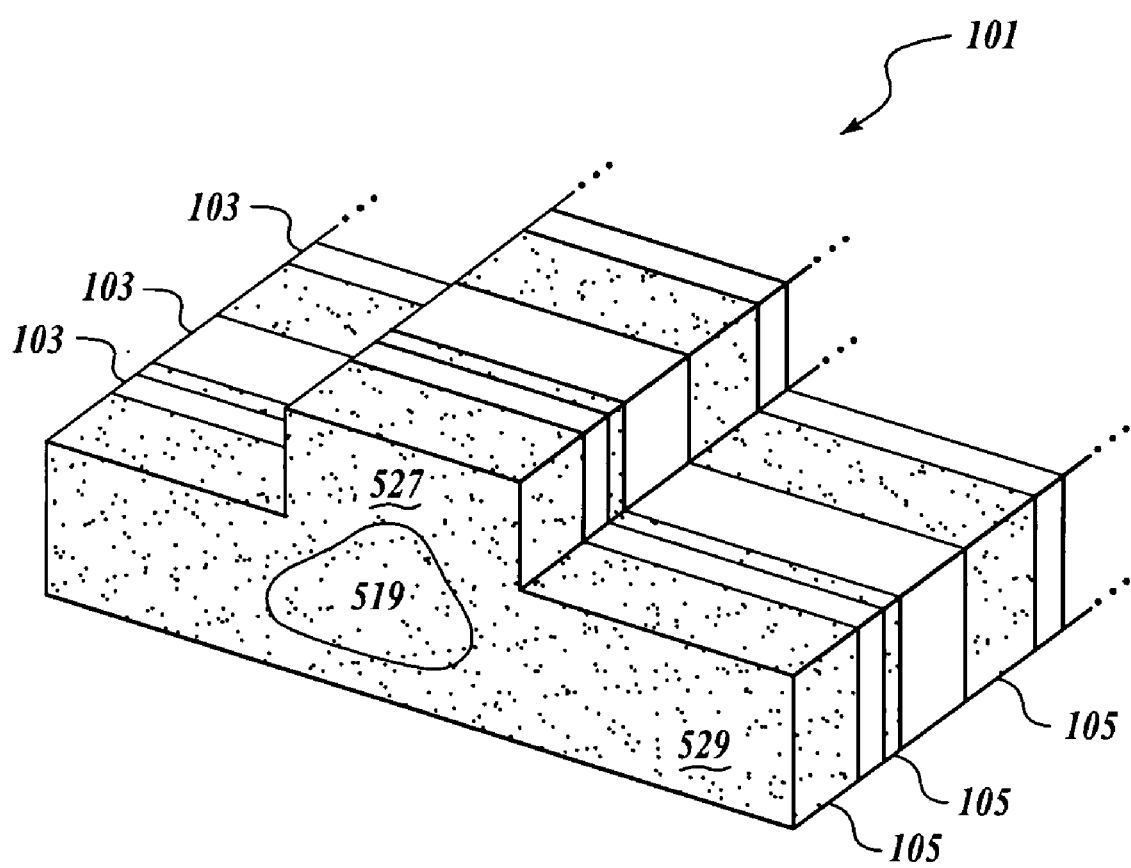
FIG. 5 illustrating a perspective view of an apodized WBG according to one embodiment of the present invention.

FIGS. 4 and 5 illustrate cross-sectional and perspective views of WBG 101 (FIG. 1), according to one embodiment of the present invention. In this embodiment, WBG 101 is disposed in substrate 103, which is a semiconductor such as crystalline silicon, with polysilicon regions 105. It is appreciated that silicon and polysilicon are example materials provided for explanation purposes and that other semiconductor materials including III–V semiconductor materials or the like may be utilized in accordance with the teachings of the present invention. As shown, a plurality of regions of polysilicon regions 105 are disposed in silicon semiconductor substrate 103 such that periodic or quasi-periodic perturbations in an effective index of refraction $n_{eff}$ are provided along optical path 117 through substrate 103.

In one embodiment in which silicon and polysilicon are utilized, having effective refractive indices of $n_{Si}$ and $n_{poly}$, respectively, a relatively small effective refractive index difference $\Delta n_{eff}$ (or $n_{poly}$-$n_{Si}$) is provided at each interface between substrate 103 and regions 105. In one embodiment, $\Delta n_{eff}$ is approximately within the range of 0.005 to 0.01. It is appreciated that other value ranges for $\Delta n_{eff}$ may be utilized in other embodiments of the present invention and that 0.005 to 0.01 is provided herewith for explanation purposes.

In a further refinement, $\Delta n_{eff}$ can be changed by performing/controlling an annealing process on the polysilicon of regions 105. For example, in one embodiment, regions 105 are formed by filling the trenches with amorphous silicon (α-Si) and then annealing the α-Si to form polysilicon. The refractive index of the resulting polysilicon ($n_{poly}$) can depend on the annealing process. Thus, by appropriately controlling the annealing process to control $n_{poly}$, $\Delta n_{eff}$ can be controlled.

Referring to FIG. 4, in this embodiment, substrate 103 is implemented as part of a silicon-on-insulator (SOI) wafer. In one embodiment, an insulating layer 407 is implemented as a buried oxide layer using known SOI processes. As a result, insulating layer 407 is disposed between silicon substrate 103 and the rest of the silicon substrate, indicated as substrate layer 413 in FIG. 4.

In this embodiment, an additional insulating layer 409 is formed on substrate 103 such that substrate 103 is disposed between insulating layers 407 and 409. Insulating layer 409 can be formed on the SOI wafer using standard deposition or low-temperature oxidation processes. In one embodiment, insulating layers 407 and 409 include an oxide material or the like. As a result, waveguide 125 is implemented in substrate 103 with cladding provided by insulating layers 407 and 409.

In this embodiment, waveguide 125 is a rib waveguide, shown as rib waveguide 525 in FIG. 5. As shown, the rib waveguide 525 includes a rib region 527 and a slab region 529. In the embodiment illustrated in FIG. 5, the intensity distribution of a single mode optical beam propagating through rib waveguide 525 is indicated as region 519. As shown, the intensity distribution of the optical beam is such that the majority of the optical beam propagates through a portion of rib region 527 toward the interior of the rib waveguide 525. In addition, a portion of the optical beam propagates through a portion of slab region 529 toward the interior of rib waveguide 525. As also shown with the intensity distribution of the optical beam, the intensity of the propagating optical beam is vanishingly small at the "upper corners" of rib region 527 as well as the "sides" of slab region 529.

Referring back to FIG. 4, optical beam 119 is directed along optical path 117 into one end of waveguide 125. In one embodiment, optical beam 119 includes infrared or near infrared light and is confined with cladding provided by insulating layers 407 and 409 to remain within waveguide 125 along optical path 117. In this embodiment, optical beam 119 is confined as a result of total internal reflection due to the lower refractive indices of the oxide material of insulating layers 407 and 409 compared to the refractive index of the silicon of substrate 103 and the polysilicon of regions 105.

In one embodiment, optical beam 119 includes a plurality of wavelengths including for example $\lambda_1$, $\lambda_2$ and $\lambda_3$. It is appreciated that although optical beam 119 has been illustrated to include three wavelengths $\lambda_1$, $\lambda_2$ and $\lambda_3$ in the illustrated example, a different number of wavelengths may be included in optical beam 119 in other embodiments of the present invention.

As previously described, there are periodic or quasi-periodic perturbations in the effective index of refraction along optical path 117 through waveguide 125. As a result of the effective refractive index difference $\Delta n_{\mathit{eff}}$ described above, multiple reflections of optical beam 119 occur at the several interfaces between substrate 103 and regions 105 along optical path 117. In this embodiment, a Bragg reflection occurs when a Bragg condition or phase matching condition is satisfied. In particular, for uniform Bragg gratings, when the condition $$m\lambda_B = 2n_{\mathit{eff}}\Lambda, \tag{1}$$

is satisfied, where m is the diffraction order, $\lambda_B$ is the Bragg wavelength, $n_{\mathit{eff}}$ is the effective index of the waveguide and $\Lambda$ is the period of the grating, a Bragg reflection occurs.

To illustrate, FIG. 4 shows a Bragg condition existing for $\lambda_B$ equal to $\lambda_2$. Accordingly, optical beam 121 including wavelength $\lambda_2$ is shown to be reflected back out of waveguide 125 out from the end into which optical beam 119 is directed. In addition, the remainder of optical beam 119 continues to propagate along optical path 117 through waveguide 125 such that the remaining wavelengths (e.g. $\lambda_1$ and $\lambda_3$) are included optical beam 123, which is propagated from the opposite end of waveguide 125. Accordingly, the Bragg wavelength $\lambda_2$ is filtered from optical beam 119 and directed out of WBG 101 as optical beam 121.

In alternative embodiments, WBG 101 can be tunable by adding a heater to control the temperature of substrate 103 and regions 105. More particularly, the indices of refraction of the materials of substrate 103 and 105 can vary with temperature. By controlling the temperature of substrate 103 and regions 105, the Bragg wavelength can be shifted.

In other alternative embodiments, the Bragg wavelength can be tuned by applying a modulated electric field to substrate 103 and regions 105 to change the effective refractive indices of substrate 103 and regions 105 (i.e., using the plasma optical effect as described in the aforementioned U.S. patent application Ser. No. 09/881,218).

Figure 6:
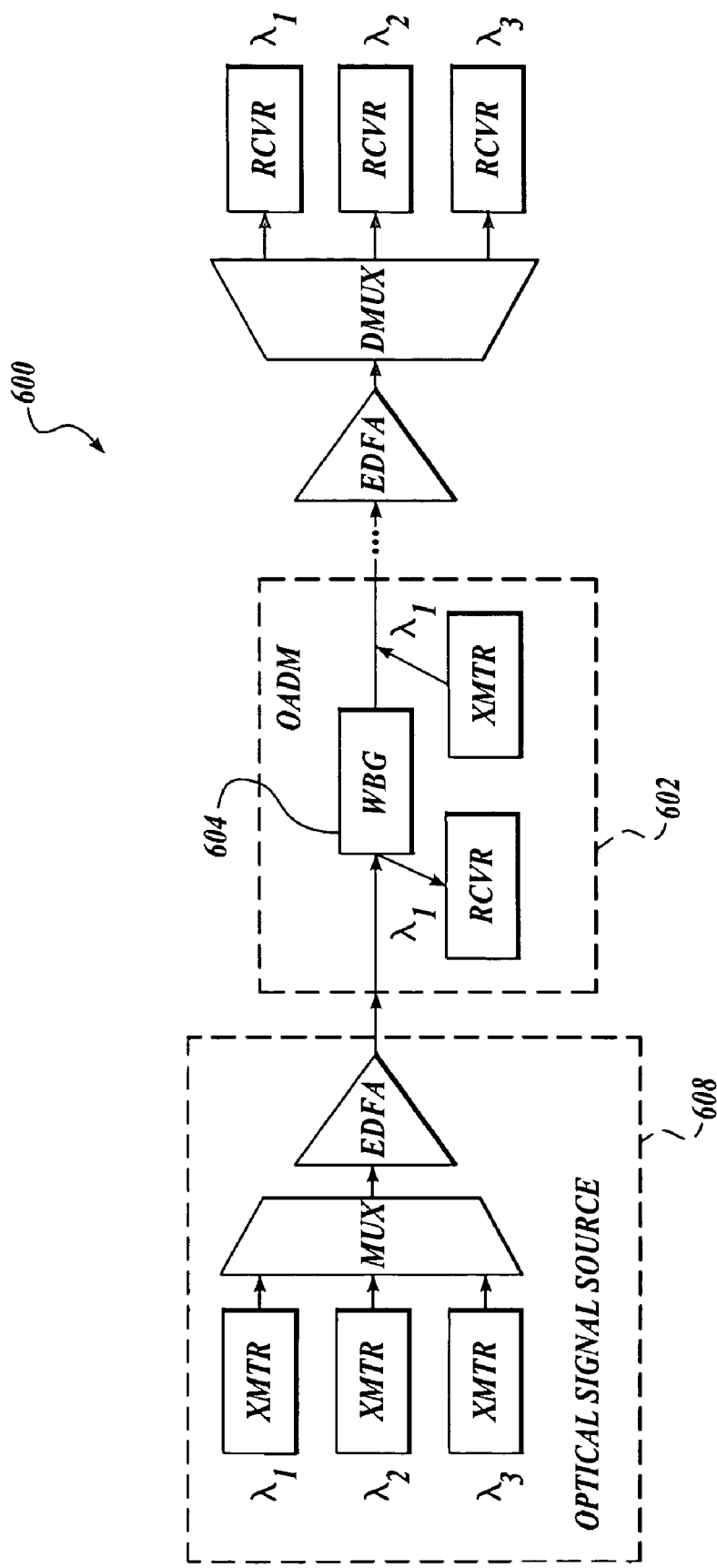
FIG. 6 is a diagram illustrating a WDM optical communication system using a WBG according to an embodiment of the present invention.

FIG. 6 is a diagram illustrating an exemplary optical communication system 600 using a WBG according to an embodiment of the present invention. In this embodiment, system 600 includes an optical add-drop multiplexer (OADM) 602 having a WBG 604, and an optical signal source 608. In this embodiment, WBG 604 is substantially similar to WBG 101 (FIGS. 4 and 5).

In one embodiment, optical signal source 608 provides an optical communications beam or the like on which data is encoded. In the example of FIG. 6, optical signal source 608 includes three optical transmitter units providing optical signals of wavelengths $\lambda_1$, $\lambda_2$ and $\lambda_3$. In this embodiment, wavelength division multiplexing (WDM) or dense wavelength division multiplexing (DWDM) or the like may be employed with the optical beam such that a different channel is encoded with each of the wavelengths included in the optical beam. In this example, the optical beam is formed by combining the transmitter output using an optical multiplexer and amplifying the resulting signal using an erbium doped fiber amplifier (EDFA). The resulting optical beam is propagated to OADM 602.

WBG 604 of OADM 602 can then be used to filter out the WBG's Bragg wavelength from the optical beam, as previously described above for WBG 101. For example, WBG 604 can filter out wavelength $\lambda_1$ to be directed to an optical receiver, and [An optical transmitter can then add] another signal of wavelength $\lambda_1$ can be added to the optical beam outputted from WBG 604 to utilize the $\lambda_1$ channel. Other OADM system implementations (not shown) can be present in system 600. In this example system, the optical beam is finally received by a termination unit having an EDFA, an optical demultiplexer and three optical receivers (one for each of wavelengths $\lambda_1$, $\lambda_2$ and $\lambda_3$).

Embodiments of method and apparatus for an apodized WBG are described herein. In the above description, numerous specific details are set forth (such as the materials of substrate 103 and regions 105, pitches, duty cycles, number of steps, etc.) to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A system comprising:
   an optical signal source; and
   an integrated circuit operatively coupled to the optical signal source, the integrated circuit including:
   a substrate, and
   a plurality of regions formed in the substrate and having refractive indices different from that of the substrate, each of the plurality of regions separated by intervening areas of the substrate to form a grating, the grating having grating periods with substantially constant pitch, wherein each of the grating periods includes one of the plurality of regions and one of the intervening areas of the substrate, wherein consecutive ones of the plurality of regions have different widths and consecutive ones of the intervening areas have different widths; and
   an optical path formed within the substrate passing through the plurality of regions and the intervening areas of the substrate.

2. The system of claim 1, wherein for each grating period of the plurality of grating periods, a grating period adjacent to that grating period has a region having a width is different from the width of that grating period's region.

3. The system of claim 1, wherein the plurality of regions are filled trenches formed in the substrate, the material filling the trenches being different from the material of the substrate.

4. The system of claim 1, wherein the plurality of regions is formed from polysilicon and the substrate is formed from crystalline silicon.

5. The system of claim 1, wherein the plurality of regions are formed proximate to a buried insulator layer of a silicon-on-insulator (SOI) wafer.

6. The system of claim 1, further comprising forming a cladding layer on the substrate and the plurality of regions.

7. The system of claim 1, wherein the optical path comprises a rib waveguide formed in the substrate, the rib waveguide containing the plurality of regions.

8. The system of claim 1, wherein the substrate and the plurality of regions form a Bragg grating.

9. The apparatus of claim 8 wherein the waveguide Bragg grating has less than 1000 grating periods with an enhanced extinction ratio of more than 10 dB over non-apodized waveguide Bragg grating.

10. The system of claim 9, wherein the waveguide Bragg grating's Bragg wavelength is electronically tunable.

11. The system of claim 9, wherein the waveguide Bragg grating's Bragg wavelength is thermally tunable.

12. A method, comprising:
    propagating an optical signal through a Xth region of a plurality of regions formed in a substrate, the plurality of regions having refractive indices different from that of the substrate, each of the plurality of regions separated by intervening areas of the substrate to form a grating, the grating having grating periods with substantially constant pitch, wherein each of the grating periods includes one of the plurality of regions and one of the intervening areas of the substrate, wherein consecutive ones of the plurality of regions have different widths and consecutive ones of the intervening areas have different widths; and
    propagating the optical signal through a Yth intervening area of the intervening areas of the substrate, the Yth intervening area being adjacent to the Xth region of the plurality of regions formed in the substrate.

13. The method of claim 12, further comprising propagating the optical signal through a Zth region of the plurality of regions formed in the substrate, the Zth region being adjacent to the Yth intervening area.

14. The method of claim 13, wherein the plurality of regions comprise polysilicon-filled trenches formed in the substrate and wherein the substrate comprises a crystalline silicon substrate.

* * * * *